(12) United States Patent
Krishnan et al.

(10) Patent No.: US 10,514,303 B2
(45) Date of Patent: Dec. 24, 2019

(54) SENSOR POD WITH BREATHABLE CABIN INTERFACE

(71) Applicant: Ford Global Technologies, LLC, Dearborn, MI (US)

(72) Inventors: Venkatesh Krishnan, Canton, MI (US); Rashaun Phinisee, Ypsilanti, MI (US); Paul Kenneth Dellock, Northville, MI (US); Harry Lobo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/637,135

(22) Filed: Jun. 29, 2017

(65) Prior Publication Data

US 2019/0003895 A1    Jan. 3, 2019

(51) Int. Cl.
| | |
|---|---|
| *G01K 1/08* | (2006.01) |
| *G01K 13/02* | (2006.01) |
| *B60R 11/04* | (2006.01) |
| *G01S 13/93* | (2006.01) |
| B29L 31/34 | (2006.01) |
| B60R 11/00 | (2006.01) |
| G01S 7/02 | (2006.01) |

(Continued)

(52) U.S. Cl.
CPC ............... *G01K 1/08* (2013.01); *B60R 11/04* (2013.01); *G01K 13/02* (2013.01); *G01S 13/931* (2013.01); B29L 2031/3481 (2013.01); B60R 2011/004 (2013.01); B60R 2300/102 (2013.01); B60S 1/56 (2013.01); G01S 17/936 (2013.01); G01S 2007/027 (2013.01); G01S 2013/9382 (2013.01)

(58) Field of Classification Search
None
See application file for complete search history.

(56) References Cited

U.S. PATENT DOCUMENTS

| 4,085,666 A | 4/1978 | Ternes |
| 5,918,972 A | 7/1999 | Van Belle |

(Continued)

FOREIGN PATENT DOCUMENTS

| CN | 100999198 A | 7/2007 |
| CN | 205293105 U | 6/2016 |

(Continued)

OTHER PUBLICATIONS

Brandon, "Meet the Founder Trying to Start the Self-Driving Car Revolution", Inc.com, Mar. 22, 2017, http://www.inc.com/magazine/201502/john-brandon/the-new-cruise-control-kyle-vogt-cruise-automation.html.

(Continued)

*Primary Examiner* — Thomas G Black
*Assistant Examiner* — Demetra R Smith-Stewart
(74) *Attorney, Agent, or Firm* — Frank A. MacKenzie; Bejin Bieneman PLC

(57) ABSTRACT

A pod includes a base, a plurality of sensor attachment fixtures, and a shell. The base is complementary in shape to a vehicle roof and includes a central opening therethrough. The sensor attachment fixtures are fixed to the base adjacent to an outer periphery of the base. The shell is fixed to and covers the base. The shell defines a cavity enclosing the sensor attachment fixtures and has a plurality of windows aligned with the sensor attachment fixtures.

19 Claims, 4 Drawing Sheets

(51) Int. Cl.
  *G01S 17/93* (2006.01)
  *B60S 1/56* (2006.01)

(56) References Cited

U.S. PATENT DOCUMENTS

| | | | |
|---|---|---|---|
| 7,218,745 B2 | 5/2007 | McConnell et al. | |
| 7,429,958 B2 | 9/2008 | Lindackers et al. | |
| 7,697,028 B1 | 4/2010 | Johnson | |
| 8,646,823 B2 | 2/2014 | Mehs et al. | |
| 9,266,405 B1 | 2/2016 | Blanchard | |
| 10,099,630 B1 * | 10/2018 | Krishnan | B60Q 1/503 |
| 2007/0090139 A1 | 4/2007 | McKenzie | |
| 2008/0129025 A1 * | 6/2008 | Ratajski | B60R 21/13 |
| | | | 280/735 |
| 2013/0261873 A1 | 10/2013 | Pal et al. | |
| 2013/0278715 A1 | 10/2013 | Nutsch et al. | |
| 2016/0221418 A1 | 8/2016 | Stover et al. | |
| 2016/0236725 A1 | 8/2016 | Shirai | |
| 2017/0028936 A1 | 2/2017 | Matsumoto | |
| 2017/0190300 A1 * | 7/2017 | Maranville | B60R 9/04 |
| 2017/0305360 A1 | 10/2017 | Zajac | |
| 2017/0369003 A1 * | 12/2017 | Williams | B60R 13/0212 |
| 2017/0369106 A1 | 12/2017 | Williams et al. | |
| 2018/0015886 A1 | 1/2018 | Frank et al. | |
| 2018/0037267 A1 | 2/2018 | Williams et al. | |
| 2018/0053313 A1 * | 2/2018 | Smith | G06T 7/292 |
| 2018/0290632 A1 * | 10/2018 | Rice | B60S 1/56 |

FOREIGN PATENT DOCUMENTS

| | | | |
|---|---|---|---|
| CN | 106240433 A | 12/2016 | |
| EP | 3034359 A1 | 6/2016 | |
| FR | 2910849 A1 | 7/2008 | |
| GB | 2553651 A | 3/2018 | |
| KR | 1020160066278 A | 6/2016 | |
| WO | WO-03031232 A2 * | 4/2003 | B60R 13/0212 |

OTHER PUBLICATIONS

Notice of Allowance dated Aug. 1, 2018 re U.S. Appl. No. 15/637,103, filed Jun. 29, 2017.
GB Search and Examination Report dated Dec. 11, 2018 re Appl. No. 1810675.7.

* cited by examiner

SENSOR POD WITH BREATHABLE CABIN INTERFACE

BACKGROUND

Autonomous vehicles may employ a plurality of sensors providing a controller or controllers with situational-awareness data including image data indicative of traffic, proximity to other vehicles, traffic control signals, traffic lane locations, etc. Such sensors may include visual sensors, e.g., cameras and LIDAR sensors. One location for visual sensors is a roof of the vehicle. The sensors may be placed in a protective pod on the roof of the vehicle. However, such pods may become very warm on sunny days, and sensor windows in the pods may become fogged or frosted with high humidity and cold temperatures. It is a problem to prevent the temperature in the pod from exceeding an acceptable operating temperature for the sensors, and to prevent windows in the pod and the sensors from becoming fogged or frosted.

DETAILED DESCRIPTION

Figure 1:
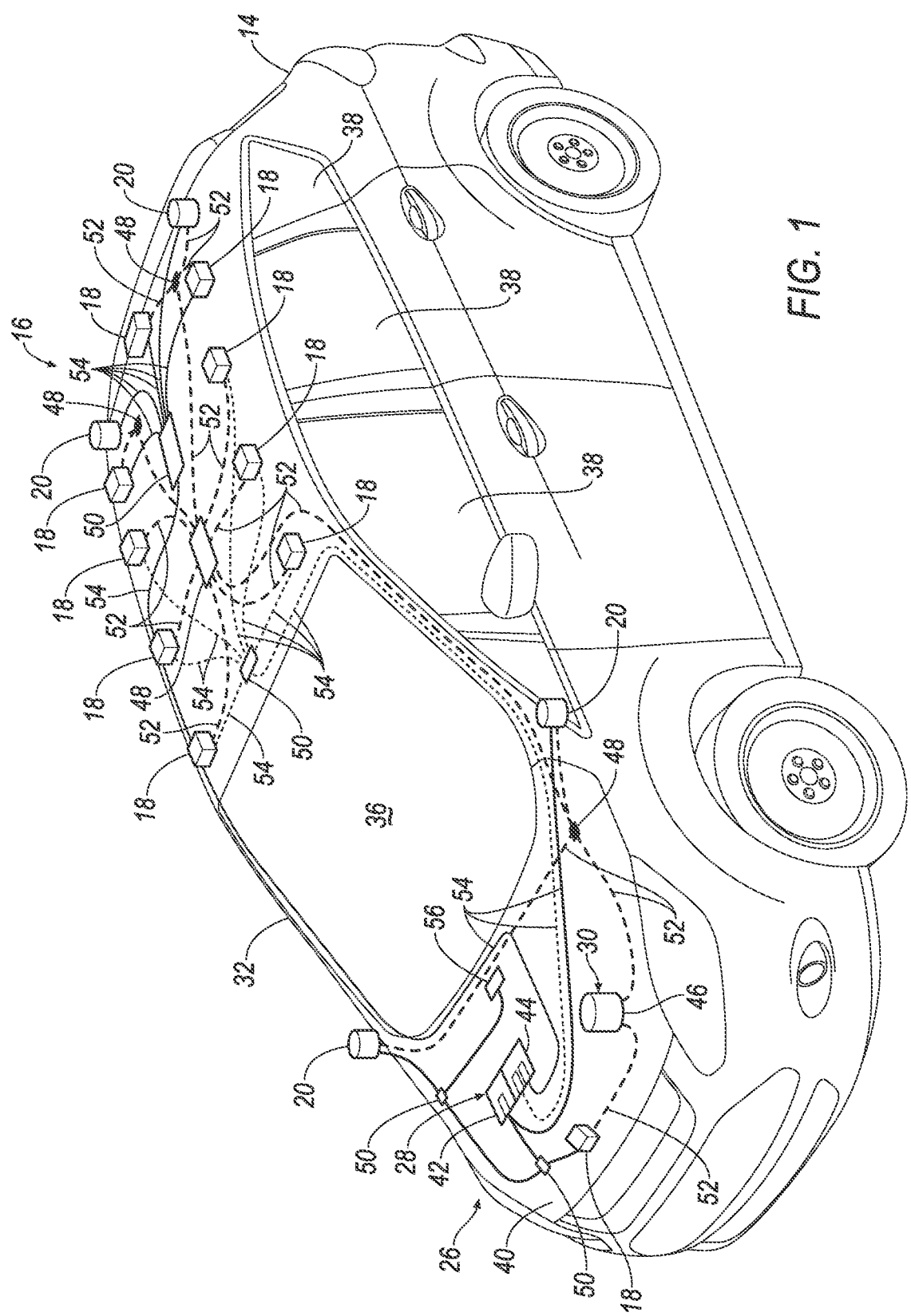
FIG. 1 is a schematic illustration of an example placement of vehicle-mounted sensor locations and sensor window cleaning system component locations for an example autonomous vehicle.

Relative orientations and directions (by way of example, upper, lower, bottom, forward, rearward, front, rear, back, outboard, inboard, inward, outward, lateral, left, right) as may be used in this description are set forth not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A pod includes a base, a plurality of sensor attachment fixtures, and a shell. The base is complementary in shape to a vehicle roof and includes a central opening therethrough. The sensor attachment fixtures are fixed to the base adjacent to an outer periphery of the base. The shell is fixed to and covers the base. The shell defines a cavity enclosing the sensor attachment fixtures and has a plurality of windows aligned with the sensor attachment fixtures.

The central opening of the pod may occupy substantially all of an area of the base inboard of the sensor attachment fixtures.

The pod may also include a plurality of fluid nozzles directed at the windows of the pod.

The pod may further include a plurality of air brush nozzles directed at the windows of the pod.

The pod may yet further include a plurality of fluid lines and pneumatic lines connecting to the nozzles.

The sensor attachment fixtures of the pod may also include a plurality of cameras and LIDAR sensors.

A pod may also include a vehicle body defining a passenger cabin therein. The vehicle body has a roof at a top of the passenger cabin. The pod is disposed in the roof.

The pod may also include a vented headliner disposed between the passenger cabin and the cavity.

The central opening may occupy substantially all of an area of the base inboard of the sensors.

The roof may define a pocket receiving the pod.

The pod may be connected to a vehicle air duct.

An example roof-mounted sensor pod 10, as illustrated in FIGS. 1-4, may be incorporated into a roof 12 of a vehicle 14. The vehicle 14 may be operable in a non-autonomous, a semiautonomous mode, i.e., a partly autonomous mode of operation requiring some, i.e., occasional, human driver intervention, or a fully autonomous mode, i.e., a fully autonomous mode requiring no human driver intervention. For purposes of this disclosure, an autonomous mode is defined as one in which each of vehicle 14 propulsion (e.g., via a powertrain including an electric motor and/or an internal combustion engine), braking, and steering are controlled by an autonomous vehicle controller, i.e., a computing device (or devices); in a semi-autonomous mode the controller controls one or two of vehicle 14 propulsion, braking, and steering.

The vehicle 14 may employ a sensor system 16 including a plurality of sensors providing the controller or controllers (not shown) with situational-awareness data including image data indicative of traffic, proximity to other vehicles, traffic control signals, traffic lane locations, etc. Such sensors may include visual sensors, i.e., sensors that provide image data such as cameras 18 and light detection and ranging ("LIDAR") sensors 20. One location for at least some of the visual sensors 18, 20 is on the roof 12 of the vehicle 14. The roof-mounted sensors 18, 20 may be disposed within the sensor pod 10 which includes a base 22 and a protective upper shell 24 disposed over the base 22 and the sensors 18, 20.

FIG. 1 schematically illustrates an example pod window cleaning system 26 that may include a washing system 28 and an air brush system 30. Example locations for the sensors 18, 20 and elements of the cleaning system 26 are illustrated.

The vehicle 14 includes a vehicle body 32 of which the roof 12 may be an uppermost part. The body 32 defines a passenger cabin 34 therein. Passengers may be accommodated within the passenger cabin 34. The vehicle body 32 may include windows, e.g., a front windshield, i.e. a windscreen 36, to allow forward viewing by passengers, as well as side windows 38 and a rear window (not shown). The vehicle body 32 also accommodates and encloses operating components, e.g., a drive motor or motors, a speed change gear box, climate control features, and energy storage devices such as batteries and fuel tanks. Such components may be mounted below the passenger cabin 34, or in front of the passenger cabin 34 or behind the passenger cabin 34. The illustrated example vehicle body 32 includes a hood, i.e., a bonnet 40, at a front of the vehicle 14 under which the motor and other components may be located.

The example cleaning system 26 includes components of the cleaning system 26 that may be disposed under the hood 40. Components of the cleaning system 26 that may be mounted under the hood 40 may include a first fluid pump 42, a second fluid pump 44, an air compressor and accumulator assembly 46, pneumatic splitters, i.e. manifolds 48, fluid splitters, i.e. manifolds 50, pneumatic lines 52, e.g. pneumatic tubes or hoses, and fluid lines 54, e.g. tubes or hoses. An air compressor alone may be used in lieu of the assembly 46. Yet alternatively, the air compressor and the accumulator of the assembly 46 may be separated by a length of connecting pneumatic line 52. A windshield wash nozzle 56 may be mounted either below the hood 40, or under the hood 40, or fixed to a windshield wiper arm (not shown).

The first fluid pump 42 and the second fluid pump 44 may be located under the hood 40 in tandem with each other, and may be connected to each other. Each of the pumps 42, 44 may be connected to one or more fluid lines 54. The fluid lines 54 communicate washer fluid to washer nozzles 58 associated with the visual sensors 18, 20.

The air compressor and accumulator assembly 46 may be connected to one or more pneumatic lines 52. The pneumatic lines 52 communicate pressurized air to air brush nozzles 60 associated with the visual sensors 18, 20.

Figure 2:
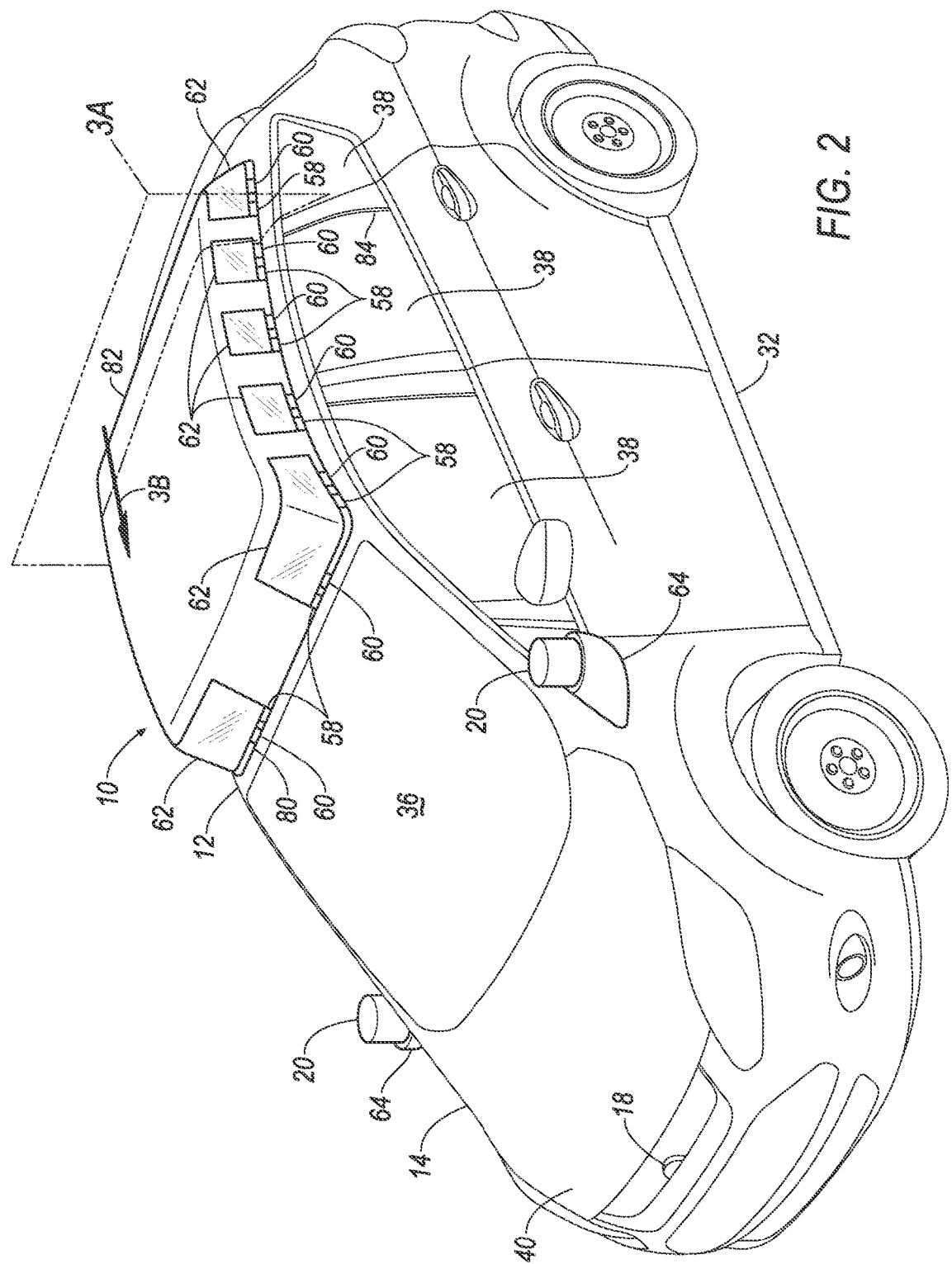
FIG. 2 is a perspective illustration of an example pod incorporated into the vehicle of FIG. 1.

FIG. 1 shows an example arrangement of pneumatic and fluid lines 52, 54 connecting the pumps 42, 44 and the assembly 46 with the visual sensors 18, 20. The connection is provided in the form of fluid nozzles 58 at ends of the fluid lines 54 and air brush nozzles 60 at ends of the pneumatic lines 52. Although not shown in FIG. 1, the nozzles 58, 60 may be positioned as shown in FIG. 2, proximate to a plurality of windows 62 in the pod 10 aligned with the sensors 18, 20. Proximate in this context means that the nozzles 58, 60 are close enough to respective windows 62 to effectively deliver air and/or fluid; i.e., as will be understood, the proximity of locations and orientations of the nozzles 58, 60 may depend on a design of the nozzles 58, 60 and an expected range of pressure of the fluid and air being dispensed by nozzles 58, 60.

Figure 3:
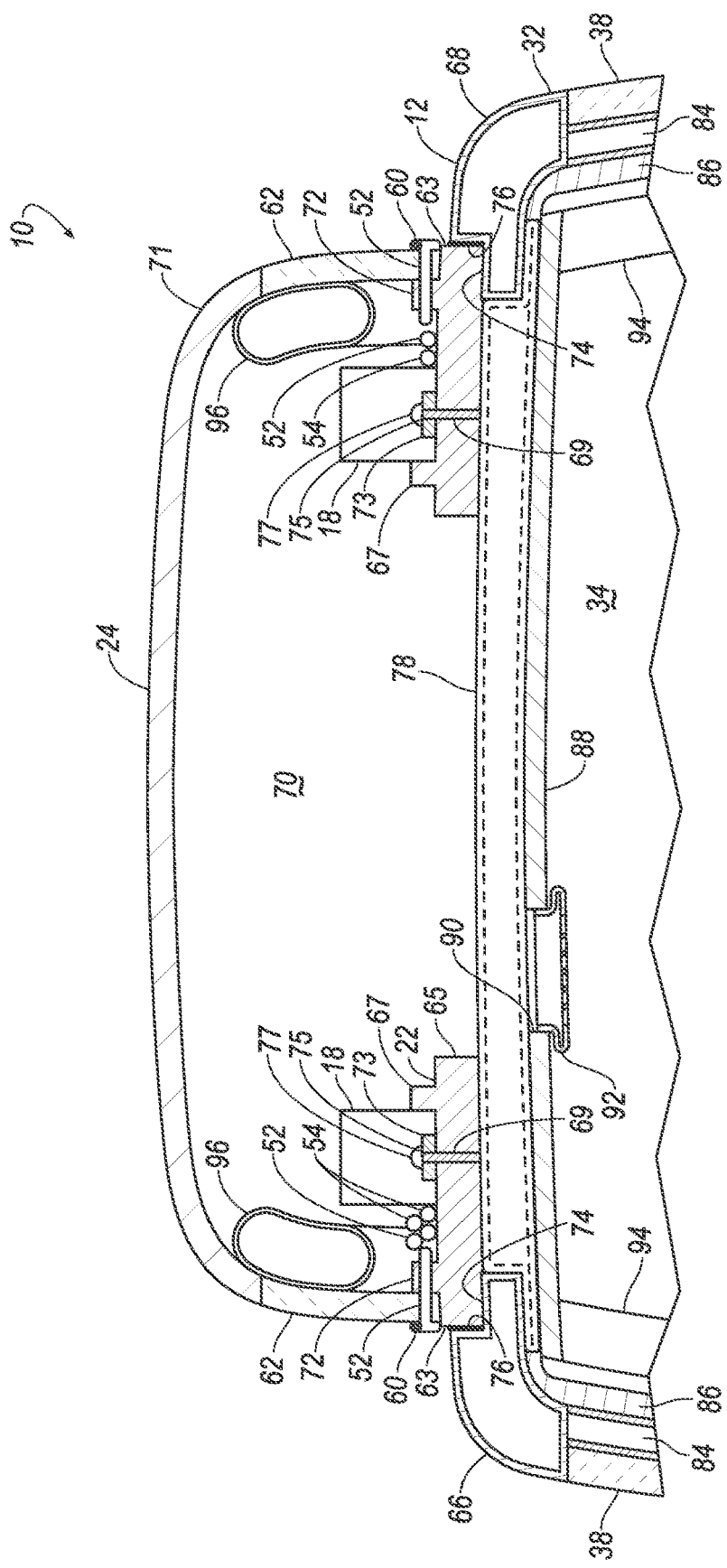
FIG. 3 is a sectional illustration of the vehicle of FIG. 2 taken through the illustrated section plane 3A in the direction of arrow 3B.

Example locations of the visual sensors illustrated in FIG. 1 include forward pedestals 64 near a bottom edge of the windshield 36 and outboard of the windshield 36, which may each support forward-positioned LIDAR sensors 20. Forward-positioned LIDAR sensors 20 may, if sized appropriately, may be disposed in a forward-most pillar, i.e., an A-pillar of the vehicle structure. A front-facing camera 18 may be placed at a forward end of the hood 40, e.g., in a grille of the vehicle 14. With the exception of the front-facing camera 18 and the pedestal-mounted LIDAR sensors 20, all of the other visual sensors 18, 20 may be incorporated into the roof-mounted sensor pod 10. The sensors 18, 20 are fixed to the base 22 proximate to an outer periphery 63 of the base 22. The outer periphery 63 defines an outermost perimeter of the base 22. A central opening 65 in the base 22 occupies substantially all of an area of the base 22 inboard, i.e., closer to a geometric center of the base 22 and the shell 24, of the sensors 18, 20. A width of each side of the base 22 between the outer periphery 63 and the opening 65, as best seen in FIG. 3, may be just wide enough to accommodate mounting and supporting the sensors 18, 20. Smaller sensors 18, 20 may allow a lighter weight base having narrower sides.

Positioning and mounting of the sensors 18, 20 on the base 22 may be facilitated by sensor attachment fixtures that may be integrated into the base 22. Example sensor attachment fixtures as illustrated in FIG. 3 may include a locating flange 67 and a threaded aperture 69. The locating flange 67 may be engaged by the associated sensor, e.g., the camera 18, to position the camera 18 on the base 22. A mounting tab 73 may extend from the camera 18. The mounting tab 73 may have an aperture 75 aligned with the threaded aperture 69 for receipt of a mounting screw 77 that fixes the camera 18 to the base 22. Alternative sensor attachment fixtures may include any suitable positioning feature and mounting feature, e.g., pockets for receiving the sensors 18, 20, locating dimples, and recesses to receive snap-in engagement tabs.

As discussed in more detail below, the central opening 65 facilitates an exchange of air, i.e., allows air to pass easily between a cavity 70 within the pod shell 24 and the passenger cabin 34. Forming the central opening 65 as large as permitted by constraints of the pod, e.g., a size of the roof 12, and mounting space requirements of the sensors 18, 20 on the base 22, may facilitate the exchange of air. Cameras 18 may be mounted at the forward corners of the pod 10. LIDAR sensors 20 may be mounted at the rearward corners of the pod 10. A plurality of outward-facing cameras 18 may be positioned along each side of the roof 12. The sensors 18, 20 may be spaced from the windows 62 considered proximate to the outer periphery 63 of the base when the sensors 18, 20 are positioned as near to the windows 62 as possible while accommodating possibly conflicting design and operational requirements of the pod 10 and the sensors 18, 20, e.g., maximizing a field of vision of the sensors, managing refractive effects, preventing fogging of the windows 62 and sensors, and accessing the sensors for maintenance.

The cameras 18 at each of a left forward corner and a right forward corner of the pod 10 may be oriented at an angle to a longitudinal, i.e., fore-aft, axis of the vehicle 14, the axis substantially parallel to longitudinally oriented left and right roof rails 66, 68. Alternatively, include two cameras 18 may be located at each corner, with one oriented in a forward-facing direction and a second camera oriented in an outboard side-facing direction.

The arrangement of the visual sensors 18, 20 may be varied from the illustrated example arrangement. For example, more or fewer cameras 18 may be used. The locations of the cameras may be varied, e.g., a camera may be placed in a center of a front of the pod 10. In any case, the visual sensors 18, 20 are arranged around the outer periphery 63 of the pod base 22.

The shell 24 disposed over the base 22 defines the cavity 70 enclosing the sensors 18, 20. The shell 24 includes the sensor-aligned transparent windows 62 best shown in FIG. 2. The shell 24 may also include a structural support portion 71 exclusive of the windows 62 that forms substantially an entire remainder of the shell 24. The support portion 71 may be non-transparent and may be formed of a material suited to holding a consistent shape, e.g., steel, aluminum, or a composite material, e.g., a polymer resin substrate reinforced by fibers, e.g., carbon fiber, glass fiber, aramid fiber, basalt fiber.

The base 22 is rigid, which in the context of this disclosure means that the base 22 may be deformable, but is provided with a predetermined stiffness to resist deformation. The stiffness of the base 22 may depend on a mass of the sensors mounted on the base 22. A stiffer base 22 may allow the sensors 18, 20 to provide improved operation by reducing a magnitude of sensor vibration responsive to vehicle suspension vibration inputs as may be induced by operation over rough roads. The base 22 may be formed of any suitable material including aluminum, steel, and composite materials, e.g., a polymer resin substrate reinforced by fibers, e.g., carbon fiber, glass fiber, aramid fiber, basalt fiber.

Figure 4:
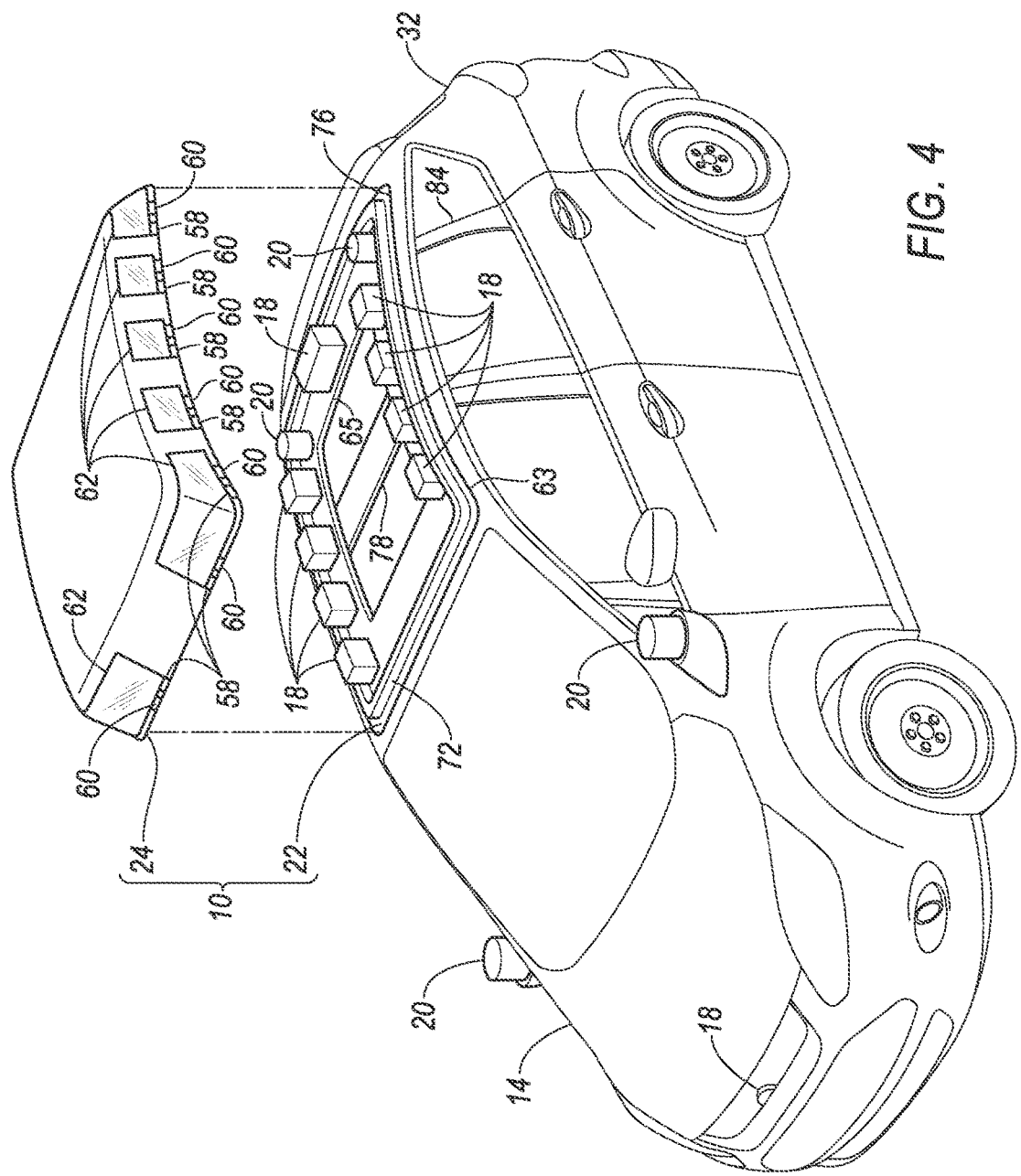
FIG. 4 is a perspective illustration of the vehicle and pod of FIG. 2 with a pod shell and a pod base shown in an exploded arrangement.

The shell 24 and base 22 are each illustrated as being substantially rectangular in shape from the perspective of a top view, consistent with FIG. 4. The base 22, and accordingly the shell 24, may be complementary in shape, i.e., in both size and geometric shape, to the roof 12. As illustrated in FIGS. 2-4, the base 22 may fit just inside the roof 12. The base 22 may alternatively be provided by or include a pair of longitudinally extending base rails in place of the left and right sides of the illustrated base 22. Each base rail may have visual sensors 18, 20 mounted to it. The base rails, with sensors 18, 20, may be slidably disposed on a track incorporated into a structure of the vehicle roof 12. The base rails, with visual sensors 18, 20 attached, may be removed from the vehicle roof 12 by sliding the base rails along the track. A door (not shown) may be provided at a rear of the shell 24 to allow removal of the base rails and attached sensors from the vehicle 14 and the shell 24 without removing the shell 24.

Each of the base 22 and the shell 24 are configured to provide an optimal strength-to-weight ratio. The strength-to-weight ratios are typically understood as being more beneficial as they increase. However, as is also understood, there are limits to the achievable strength-to-weight ratios imposed by factors that may include performance constraints of available materials and manufacturing and material costs of the base 22 and the shell 24.

The windows 62 are transparent for light frequencies to which the sensors 18, 20 are sensitive, allowing the substantially unimpeded transmittal of light therethrough. The windows 62 may be formed of a transparent thermoplastic, e.g., acrylic glass, or polycarbonate material. Other example transparent materials include silicate glass, including laminated glass, and titanium dioxide in its transparent form. The windows 62 are fixed within the shell 24 and may be aligned with the sensors 18, 20. Nozzles 58, 60 may be fixed to an exterior of the shell 24 and oriented towards the windows 62. The windows 62 at the corners of the shell 24 may be of a wrap-around type as shown in FIG. 2.

The shell 24 may be positioned on the base 22 by an upwardly-extending locating rim 72 of the base 22, best shown in FIG. 3. The shell 24 may be bonded directly to the base 22 with a sealing adhesive. Alternatively, a discrete, i.e. separately formed, seal (not shown) may be disposed between the shell 24 and the base 22. The seal may be bonded to one or both of the shell 24 and the base 22 with a sealing adhesive. When a discrete seal is used, a mechanical clamping system (not shown) fixing the shell 24 to the base 22 may be included.

The example section of FIG. 3, taken through plane 3A in the direction of arrow 3B of FIG. 2, shows additional detail. The base 22 of the pod 10 may rest on support lips 74 of outboard roof rails 66, 68. The roof rails 66, 68 may define in part a pod receiving pocket 76 in the roof 12 of the vehicle. Further support of the base 22 may be provided by one or more cross members 78 that may laterally connect the roof rails 66, 68. The receiving pocket 76 may be laterally defined by cross members (not shown) at a front end 80 and a back end 82 of the pod 10. The base 22 may be fixed within the receiving pocket 76 by applying a sealing adhesive between the base 22 and a supporting roof structure, including the roof rails 66, 68 and the cross members. Alternatively, a discrete seal may be disposed between the base 22 and the supporting roof structure. The seal may be adhesively bonded to both the roof structure and the base 22. Yet further, the seal may be mechanically compressed between the roof structure and the base 22 by a mechanical mounting system (not shown). One example mechanical mounting system includes threaded fasteners that pass through the lips 74 and thread into the base 22, clamping the base 22 to the roof 12.

A mechanical mounting system, in combination with a discrete seal disposed between the base 22 and the supporting roof structure, allows the entire pod 10 to be removed from the vehicle 14, facilitating repair and replacement of any sensors 18, 20 mounted in the pod 10. Alternatively, the use of a mechanical mounting system, in combination with a discrete seal between the base 22 and the shell 24, allows the shell 24 to be removed from the base 22 and the vehicle 14, as shown in FIG. 4, to facilitate repair and replacement of any sensors 18, 20 mounted in the pod 10. Yet further alternatively, a base rail system, as described above, may allow slidable removal of the base rails and the attached sensors for service.

The lines 52, 54 may be routed along the base 22 of the pod 10. Pneumatic lines 52 are shown passing through the rim 72 and the shell 24 to reach nozzles 60. Alternatively, the lines 52, 54 may be fixed to an upper part of the shell 24, above the sensors 18, 20.

Rails 66, 68 may be supported by vertical structural components, e.g. a C-pillar 84. Exterior components, e.g., exterior windows 38, may be fixed to the C-pillar 84 and the roof rails 66, 68. An interior trim panel 86 may be fixed to an inboard side of the vertical structural component 84.

A vented headliner 88 is disposed between the passenger cabin 34 and the pod cavity 70. The headliner 88 allows free communication of air between the passenger cabin 34 and the pod cavity 70. The headliner 88 may be formed of an air-permeable fabric (e.g., needle-perforated membranes, woven fabrics) to facilitate a flow of air, i.e., venting, between the cabin 34 and the cavity 70. Such fabric may be selected for high permeability, i.e., low resistance to air flow across the fabric. Alternatively, or as a supplement to the permeable fabric, a plurality of apertures 90 may be provided in the headliner 88. The apertures 90 may each be fitted with a vent insert 92 that may include louvers. The size and the quantity of apertures 90 and inserts facilitate air flow, especially from the cavity 70 into the cabin. Having the central opening 65 as large as possible may maximize a flow area for communicating air between the cabin 34 and the pod cavity 70, particularly when air-permeable fabric is employed as part of the headliner 88.

Primary vehicle air ducts 94 connecting to an air management system, e.g., a heating, ventilation and air conditioning ("HVAC") system of the vehicle 14, may connect to the pod 10. The pod 10 may include secondary ducts 96 connected to the primary vehicle air ducts 94. The ducts 94, 96 communicate cooling air, e.g., air at 40 degrees Fahrenheit, and warming air, e.g., air at 150 degrees Fahrenheit, into the cavity 70, with the temperature of the air depending on the system needs to avoid condensation.

In operation, the communication of air from the HVAC system into the cavity 70 maintains the sensors 18, 20 within an acceptable temperature operating range and avoids or eliminates a formation of water condensate on the sensors 18, 20 and on the windows 62.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A pod comprising:
   a base complementary in shape to a vehicle roof and including a central opening therethrough;

a plurality of sensor attachment fixtures fixed to the base adjacent to an outer periphery of the base; and a shell fixed to and covering the base and defining a cavity enclosing the sensor attachment fixtures and having a plurality of windows aligned with the sensor attachment fixtures.

2. The pod of claim 1, wherein the central opening occupies substantially all of an area of the base inboard of the sensor attachment fixtures.

3. The pod of claim 1, further comprising a plurality of fluid nozzles directed at the windows of the pod.

4. The pod of claim 3, further comprising a plurality of air brush nozzles directed at the windows of the pod.

5. The pod of claim 4, further comprising a plurality of fluid lines and pneumatic lines connecting to the nozzles.

6. The pod of claim 1, wherein a plurality of cameras and LIDAR sensors are connected to the base at the sensor attachment fixtures.

7. The pod of claim 2, further comprising a plurality of fluid nozzles directed at the windows of the pod.

8. The pod of claim 7, further comprising a plurality of air brush nozzles directed at the windows of the pod.

9. The pod of claim 8, further comprising a plurality of fluid lines and pneumatic lines connecting to the nozzles.

10. The pod of claim 2, wherein a plurality of cameras and LIDAR sensors are connected to the base at the sensor attachment fixtures.

11. The pod of claim 1, further comprising:
a vehicle body defining a passenger cabin therein and having a roof at a top of the passenger cabin; and
the base being disposed in the roof.

12. The pod of claim 11, further comprising: a vented headliner disposed between the passenger cabin and the cavity.

13. The pod of claim 12, wherein the central opening occupies substantially all of an area of the base inboard of the sensor attachment fixtures.

14. The pod of claim 12, further comprising a plurality of fluid nozzles directed at the windows of the pod.

15. The pod of claim 14, further comprising a plurality of air brush nozzles directed at the windows of the pod.

16. The pod of claim 15, further comprising a plurality of fluid lines and pneumatic lines connecting to the nozzles.

17. The pod of claim 12, wherein a plurality of cameras and LIDAR sensors are connected to the base at the attachment fixtures.

18. The pod of claim 12, wherein the roof defines a pocket receiving the pod.

19. The pod of claim 12, wherein the pod is connected to a vehicle air duct.

* * * * *